Figure 1:
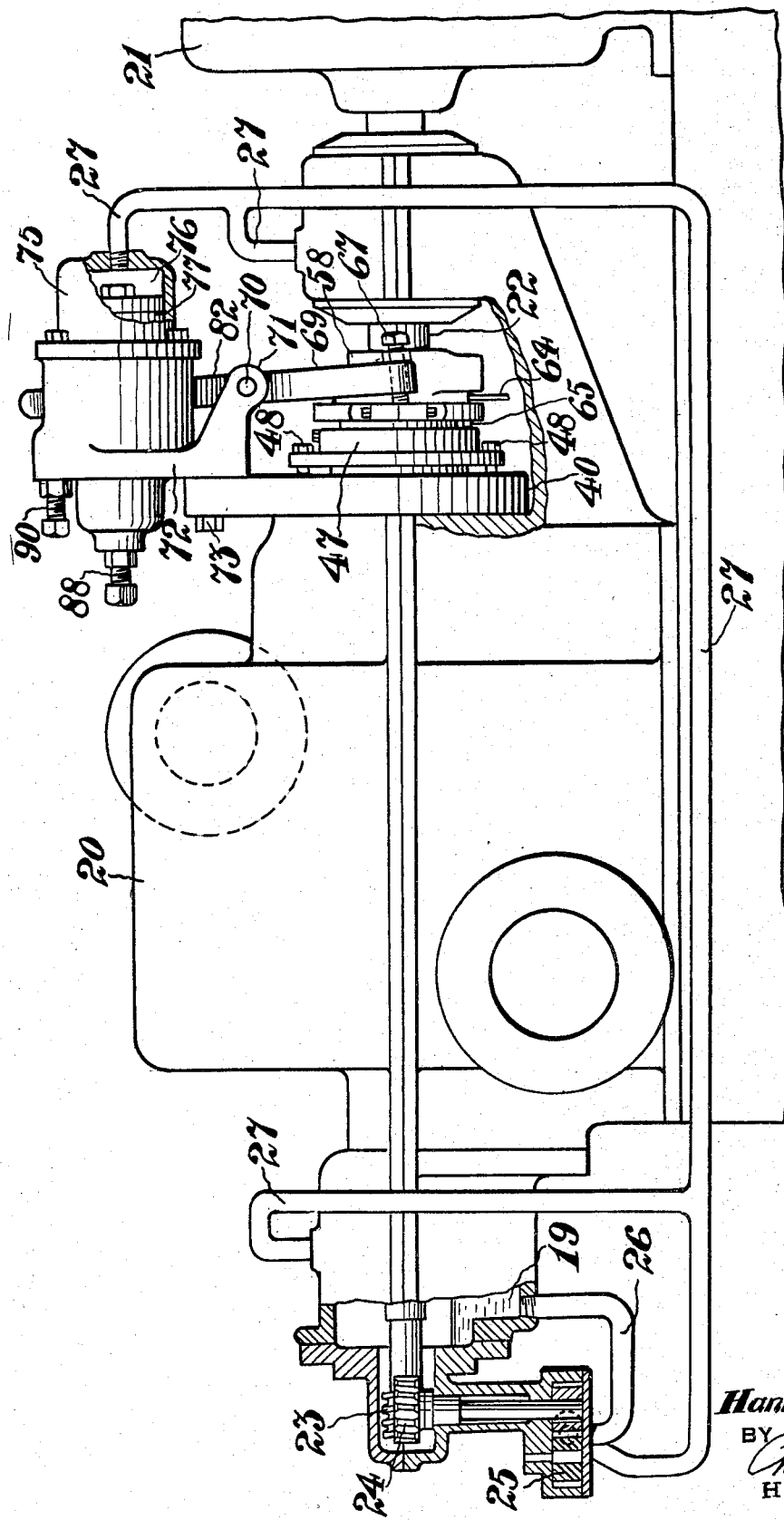

Oct. 26, 1937.  H. HORNSCHUCH  2,096,899
SEALING DEVICE
Filed Aug. 7, 1935  2 Sheets-Sheet 1

INVENTOR
*Hanns Hornschuch*.
BY
*Chester A. Adee*
HIS ATTORNEY.

Oct. 26, 1937.  H. HORNSCHUCH  2,096,899
SEALING DEVICE
Filed Aug. 7, 1935    2 Sheets-Sheet 2

INVENTOR.
Hanns Hornschuch
BY
HIS ATTORNEY

Patented Oct. 26, 1937

2,096,899

UNITED STATES PATENT OFFICE 2,096,899

SEALING DEVICE

Hanns Hornschuch, Easton, Pa., assignor to Ingersoll-Rand Company, Jersey City, N. J., a corporation of New Jersey Application August 7, 1935, Serial No. 35,082

5 Claims. (Cl. 286—7)

This invention relates to sealing devices, and more particularly to a sealing device for a rotary member, as for example the shaft of a centrifugal pump.

One object of the invention is to assure a true sealing contact between the elements intended to effect a seal.

Another object is to augment the means normally relied upon for maintaining a seal during such conditions of operation of the pump as might tend to cause a breach between the sealing members.

Still another object is to enable such augmenting force to be automatically applied and removed in accordance with variations in the operating speed of the pump.

Other objects will be in part obvious and in part pointed out hereinafter.

Figure 2:
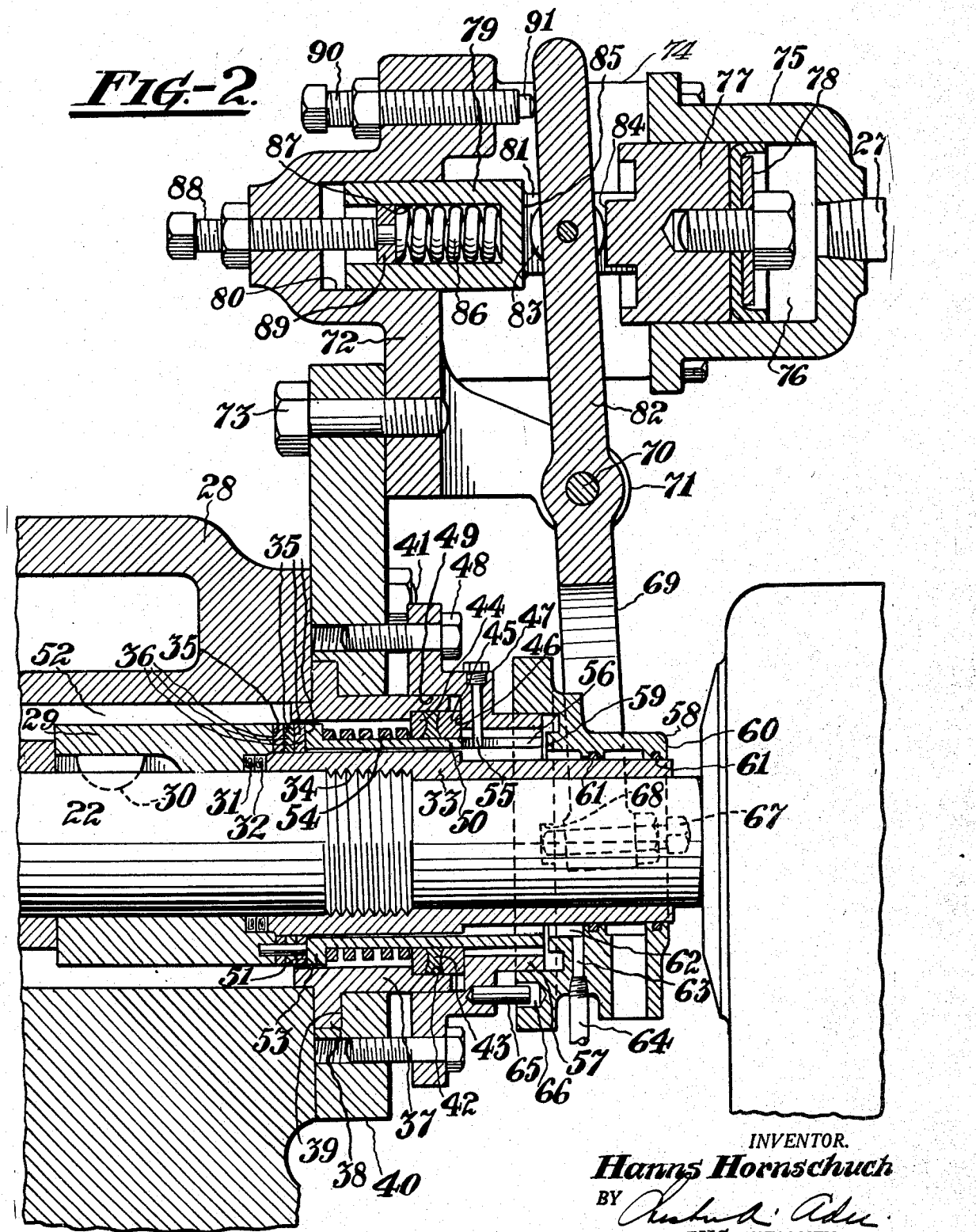

In the drawings accompanying this specification and forming a part thereof,

Figure 1 is a longitudinal elevation, partly broken away, of a pump equipped with a sealing device constructed in accordance with the practice of the invention, and Figure 2 is an elevation, in section, of the sealing device and a portion of the pump.

Referring to the drawings, and at first more particularly to Figure 1, 20 designates a pump of the centrifugal type and 21 a motor connected to a shaft 22 of the pump for driving the rotary elements of the pump.

The shaft 22 carries a gear 23 which meshes with a driving gear 24 of a pump 25, shown as being a gear pump, for pumping lubricant under pressure to the various bearing surfaces of the pump requiring lubricant. The intake side of the pump 25 is connected, by a conduit 26, with an oil reservoir 19, and the discharge output of the pump 25 is conveyed therefrom by a conduit 27 having suitable branches to connect it with points in the pump 20 requiring lubrication.

The ends of the casing of the pump 20 constitute stuffing boxes through which the shaft 22 extends loosely. In Figure 2 is shown the stuffing box 28 adjacent the discharge side of the pump 20, and on the portion of the shaft 22 lying within the stuffing box 28 is a sleeve 29 which is secured to the shaft 22 by a key 30 so that the sleeve 29 will rotate with the shaft. In the outermost end of the sleeve 29 is an internal recess 31 containing packing material 32 which encircles the shaft 22 and is compressed by a sleeve 33 threaded on the shaft 22, as indicated at 34.

The outer end of the sleeve 29 may constitute a sealing surface 35 or, as illustrated, a seat for the innermost of a series of rings 36 disposed about the sleeve 33 to provide renewable sealing surfaces whenever an active surface 35 becomes worn or otherwise unfit for maintaining a seal.

Extending into the outer end of the stuffing box 28, in order to centralize it therewith, is a sleeve 37 having a lateral flange 38 which seats against the end of the stuffing box and lies within a recess 39 of a plate 40 secured to the stuffing box, as by bolts 41, for clamping the sleeve 37 in position. In the outer end of the sleeve 37 is an enlarged bore or recess 42 containing a compressible packing member 43 which is interposed between rings 44 and 45.

The ring 44 is seated in the bottom of the recess 42, and the ring 45 extends part way beyond the end of the sleeve 37 and abuts a shoulder 46 on a gland 47 encircling the shaft 22. The gland 47 is secured to the plate 40 by bolts 48 and has a bore 49 in its inner end to receive the end of the sleeve 37 for centralizing the two with respect to each other.

The inner surfaces of the rings 44 and 45 serve as guiding surfaces for a sealing member 50 shown as being in the form of a sleeve having a bore of slightly larger diameter than the adjacent portion of the sleeve 33 which it encircles to avoid contact between the two. Upon being compressed, the packing member 43 bears against the periphery of the sleeve 50 to effect a seal at that point and, by seating against the peripheral surface of the recess 42, to prevent leakage of fluid over the outer surfaces of the rings 44 and 45.

The inner end of the sleeve 50 constitutes a sealing surface 51 which cooperates with the adjacent sealing surfaces 35 to prevent leakage of liquid from the interior 52 of the stuffing box and which interior may be in free communication with the discharge end of the pump 20. The sealing surface 51 is co-extensive with the ends of the sleeve 50 and a lateral flange 53 on the sleeve 50.

The opposite side of the flange 53 serves as a seat for a spring 54 interposed between the flange 53 and the ring 44 and acting constantly to press the sealing surface 51 into sealing relationship with the adjacent sealing surface 35. In its assembled position the spring 54 is initially compressed by the gland 47 so that said spring exerts a constant pressure against the flange 53 for the purpose set forth.

The sleeve 50, while it may move longitudinally of the shaft 22, is non-rotatable and is held against such movement by a pin 55 seated in the gland 47 and extending into a longitudinally extending slot 56 in the sleeve 50.

In practice, it has been found that an effective seal may be maintained between the cooperating surfaces of relatively rotary and stationary members, such as the sleeve 50 and the rings 36, by the force of the spring 54 during the normal operation of the pump, that is, during such times as the pump is operating at normal speeds. The sealing surfaces 35 and 51, being initially constructed for maximum contact with each other and seated against each other to exclude solids entrained in the liquid being pumped, will remain in sealing engagement with each other and prevent leakage of liquid between their cooperating surfaces. It has been found, however, that during certain periods of operation, for example during the starting period of the pump, the pump shaft vibrates to such an extent that the parts constituting the sealing surfaces are shifted in sufficient degree with respect to each other to provide an opening between the sealing members, thereby making it possible for solid particles to be trapped between them.

The seal is then, of course, broken, and during the subsequent operation of the pump large quantities of liquid will pass directly from the pump through the sealing device and along the shaft to the exterior of the pump. It is accordingly contemplated to augment the force of the spring 54 for preventing separation of sealing members during such periods of vibratory movement of the shaft 22 and to cause the augmenting force to be automatically applied to and removed from the sleeve 50 in accordance with the occurrence or non-occurrence of the force tending to break sealing engagement between the sleeve 50 and the surface against which it seats.

In furtherance of this end the gland 47 is provided with an extension 57 to serve as a guide for a collar 58 disposed slidably thereon and having an annular shoulder 59 which is adapted to seat against the end of the sleeve 50. The collar 58 encircles the shaft 22, and in the inner surface of an extension 60 of the collar are arranged packing members 61 which seat upon the surface of the sleeve 33.

In the end of the collar 58 adjacent the sleeve 50 is a recess 62 and a passage 63 on the collar connects the recess 62 with the conduit 64, threaded into the collar, to provide an outlet for such slight amounts of liquid as may pass between the sealing surfaces 51 and 35.

The collar 58 is capable of reciprocable movement on the extension 57, but is held against rotary movement with respect thereto, in the present instance, by a pin 65 which is affixed to the gland 47 and extends into an aperture 66 in the adjacent face of the collar 58. The collar may be additionally held against rotary movement by bolts 67 extending into sockets 68 in the collar and being threaded through the ends of a yoke 69 whereby the collar 58 is actuated.

The yoke 69 is mounted upon a pivot 70 seated in an arm or arms 71 of a bracket 72 secured to the plate 40 as by bolts 73. The bracket 72 has an extension 74 which is arranged in substantial parallelism with the shaft 22 and supports at its outer end a cylinder 75 having a piston chamber 76 into which lubricant, under pressure, is conveyed from the pump 25 by the conduit 27. The piston chamber 76 contains a piston 77 having a pressure area 78 at one end against which the lubricant acts for moving the piston in one direction, and on the other end of the piston is a stem 79 which extends slidably into a recess 80 in the bracket 72.

Within the stem 79 is a slot 81 through which extends a lever 82 forming an integral portion of the yoke 69, and on the portion of the lever 82 lying in the plane of the slot 80 is mounted a roller 83 which is adapted to bear against end surfaces 84 and 85 of the slot 81, accordingly as the piston 77 moves in one direction or the other.

The lubricant under pressure acting against the pressure area 78 is opposed by a spring 86 disposed in a recess 87 in the stem 79. The tension of the spring 86 may be controlled by a screw 88 threaded into the bracket 72 and carrying on its inner end a plate 89 which serves as a seat for the spring 86.

In order to limit the distance which the piston 77 may actuate the yoke 69 for moving the collar 58 out of contact with the sleeve 50, a screw 90 is threaded into the bracket to extend with its leading end 91 into the path of the lever 82. The screw 90 may be adjusted, as required, to determine the clearance between the sleeve 50 and the shoulder 59 of the collar 58 in the releasing position of the collar.

The operation of the device is as follows: Let it be assumed that the pump is idle and that the tension of the spring 86 is adjusted to yield to a pressure normally maintained in the lubricating system and acting against the pressure area 78 of the piston 77. The spring 86 will then rock the collar 58 against the sleeve 50 and press it firmly thereagainst during the subsequent starting and accelerating period of the pump 20.

The spring 86 will thus augment the pressure of the spring 54 for maintaining the sealing surface 51 seated firmly against the adjacent sealing surface 35. During the accelerating period of the pumps 20 and 25, and at which time the pump shaft 22 is subjected to the vibratory movement hereinbefore stated, the collar 58 remains in this position until the value of the pressure in the lubricating system approaches that maintained during the normal operation of the pump 20, that is, when the pump 20 approaches or reaches normal speed.

The lubricant under pressure then acting against the pressure area 78 will predominate over that exerted by the spring 86, and the lever 82 will be rocked against the end 91 of the screw 90. In this position of the lever the pressure of the yoke 69 is removed from the collar 58 which may then move out of engagement with the sleeve 50, and the spring 54 will thereafter be able to maintain the sealing surface 51 in full sealing engagement with the sealing surface 35.

As will be readily seen, therefore, the augmenting pressure of the spring 86 is only applied to the sleeve 50 during the comparatively short period of starting of the pump 20 so that the sealing surfaces 51 and 35 will not be subjected constantly to the rapid wear which would result by employing a spring 54 of sufficient strength to prevent separation of the sealing surfaces 51 and 35 under all conditions of operation of the pump.

The collar 58 remains disengaged from the sleeve 50 as long as the pressure in the lubricating system approximates the value relied upon for effecting efficient lubrication and while the pump 20 is operating at normal speeds. However, shortly after the beginning of a decelerating period of the pump, as when it is intended to stop its operation so that the pressure in the lubricating system again decreases, the spring 86 will again rock the yoke 69 and press the collar 58 against the sleeve 50. In this way the spring 86 and the collar serve to prevent the separation of the sealing surface 51 from the sealing surface 35 and to maintain the collar in such engagement until the speed of the shaft 22 again approaches or reaches normal during a subsequent period of operation.

I claim:

1. In a sealing device, the combination of a casing and a rotor, a sealing surface on the rotor, a sealing member slidable in the casing and constantly engaging the sealing surface for effecting a seal, and pressure responsive means operative during the starting and stopping periods of the rotor for determining the degree of sealing pressure between the sealing surface and the sealing member.

2. In a sealing device, the combination of a casing and a rotor, a sealing surface on the rotor, a sealing member slidable in the casing to cooperate with the sealing surface for preventing leakage of fluid from the casing, a spring for constantly maintaining the sealing member in sealing engagement with the sealing surface, means for augmenting the force of the spring, and pressure responsive means for controlling the first said means.

3. In a sealing device, the combination of a casing and a rotor, a sealing surface on the rotor, a sealing member slidable in the casing constantly cooperating with the sealing surface for preventing leakage of fluid from the casing, a spring for constantly pressing the sealing member into sealing relationship with the sealing surface, means for augmenting the pressure of the spring, and pressure responsive means for rendering the first said means non-effective.

4. In a sealing device, the combination of a casing and a rotor, a sealing surface on the rotor, a sealing member slidable in the casing to cooperate with the sealing surface for preventing leakage of fluid from the casing, a plurality of springs for pressing the sealing member against the sealing surface and one of said springs constantly acting to hold the sealing member in sealing relation with the sealing surface, and pressure responsive means for controlling the pressure of the other spring.

5. The combination of a rotary shaft with a sleeve having an annular recess at one end thereof and encircling said shaft and rotatable therewith, packing material in the recess in contact with the shaft, a second sleeve to compress said packing material and to hold the first sleeve against axial movement, a third sleeve encircling the second sleeve held against rotation therewith, a sealing element between the adjacent ends of the first and third sleeves, a collar slidably mounted upon the shaft and adapted to bear against the third sleeve, and pressure responsive means to control the pressure exerted upon the third sleeve by said collar.

HANNS HORNSCHUCH.